United States Patent
Benson

(10) Patent No.: US 6,714,926 B1
(45) Date of Patent: Mar. 30, 2004

(54) USE OF BROWSER COOKIES TO STORE STRUCTURED DATA

(75) Inventor: Eric A. Benson, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/494,712

(22) Filed: Jan. 31, 2000

Related U.S. Application Data

(60) Provisional application No. 60/118,266, filed on Feb. 2, 1999.

(51) Int. Cl.[7] .............................................. G06F 17/30
(52) U.S. Cl. ......................... 707/2; 707/100; 707/101; 707/102; 707/103
(58) Field of Search ................ 707/500, 1, 2, 707/3, 100, 101, 102, 103; 709/203, 224, 225, 226, 217

(56) References Cited

U.S. PATENT DOCUMENTS

| | | | |
|---|---|---|---|
| 5,774,670 A | | 6/1998 | Montulli |
| 5,826,242 A | | 10/1998 | Montulli |
| 5,848,396 A | | 12/1998 | Gerace |
| 6,073,241 A | * | 6/2000 | Rosenberg et al. .......... 713/201 |
| 6,085,224 A | * | 7/2000 | Wagner ....................... 709/203 |
| 6,249,795 B1 | * | 6/2001 | Douglis ....................... 715/511 |
| 6,330,566 B1 | * | 12/2001 | Durham .................... 707/104.1 |
| 6,374,359 B1 | * | 4/2002 | Shrader et al. .............. 709/229 |
| 2001/0010722 A1 | * | 8/2001 | Enari .......................... 380/277 |
| 2001/0053979 A1 | * | 12/2001 | Kori ................................ 705/1 |

OTHER PUBLICATIONS

Stonebraker, M., "Managing Persistent Objects In A Multi-Level Store," Proceedings of the 1991 ACM SIGMOD International Conference on Management of Data, May, 1991.

* cited by examiner

Primary Examiner—Isaac Woo
(74) Attorney, Agent, or Firm—Knobbe, Martens, Olson & Bear, LLP

(57) ABSTRACT

A web site system implements a process for storing selected data structures within browser cookies. The data structures may contain a variety of different types of data elements, including N-bit integers and other non-character elements. A version tracking scheme provides forward and backward compatibility between client and server software. The process is implemented without the need for any browser extensions, and without the need for users to download any special code to their computers.

46 Claims, 3 Drawing Sheets

USE OF BROWSER COOKIES TO STORE STRUCTURED DATA

RELATED APPLICATIONS

This application claims the benefit of U.S. provisional application No. 60/118,266, filed Feb. 2, 1999.

FIELD OF THE INVENTION

The present invention relates to Web site customization using cookies, and more particularly, to a method of extending the functionality of cookies to increase Web site performance.

BACKGROUND

Commercially available Web browsers such as Internet Explorer and Netscape Navigator support a mechanism by which a Web server can store persistent information on a user's machine for subsequent retrieval. This information is commonly referred to as a "cookie," and typically includes information about the user's identity. The cookie is stored on the user's computer as a name-value pair (NAME=VALUE), together with a URL (or range of URLs) to which the cookie corresponds and an optional expiration date. When the user initiates a request for a URL that corresponds to the cookie, the browser automatically sends the cookie (and any other cookies that correspond to the requested URL) to the host Web server with the URL request.

One common application for cookies involves dynamically customizing Web pages and functions for known users of a Web site. Typically, this involves storing known information about the user, such as a user ID, on the user's computer in response to a page request. When the user subsequently accesses the Web site, the information contained within the cookie is used to access a back-end database to retrieve additional information about the user, such as the user's preferences or account information. This database information may then be used to customize the requested Web page.

One problem with the above approach is that it requires frequent accesses to the database. For Web sites that experience many thousands of hits per day, the need to access the database can produce a significant performance degradation. The performance degradation may be the result of a limited load capacity of the database system, increased network traffic between physical Web servers and the database system, or both.

SUMMARY

One potential solution to the above problem would be to store within cookies all of the user information needed to customize the Web pages, or at least the most frequently accessed Web pages. This would allow accesses to back-end databases during page requests to be reduced or avoided. Unfortunately, the existing cookies specification does not provide a mechanism for storing non-character data. Thus, for example, where the database information used to customize Web pages includes a list or table of 16-bit integers, storing such data within browser cookies is not a viable option. Further, the existing cookies specification does not provide a mechanism for allowing server software to keep track of versions of data elements contained within cookies.

The present invention overcomes this problem by providing a server system and process for storing selected data structures within browser cookies, preferably using a version tracking scheme to provide forward and backward compatibility between client and server software. The data structures may contain a variety of different types of data elements, including N-bit integers and other non-character elements. The process is implemented without the need for any browser extensions, and without the need for users to download any special code to their computers.

In a preferred embodiment, the system uses a schema file or other data structure that specifies past and present schemas for encoding data structures within cookies. A first server component uses the schema file to encode data structures into character strings that are stored within cookies on user computers. A checksum value, a length field, and a schema version number are also preferably encoded within the cookies. A second server component receives cookies from user computers, uses the schema file to identify the types of data structures stored in such cookies, and reproduces the data structures in local memory for temporary use. Application software uses these temporary data structures to generate personalized web pages and/or perform other custom operations.

DETAILED DESCRIPTION OF A PREFERRED EMBODIMENT

A preferred embodiment of the process and associated components will now be described with reference to FIGS. 1–3. Throughout these figures and the associated description, reference will be made to various implementation-specific details such as specific data types, algorithms, rules and conventions. These and other details are provided in order to illustrate an example implementation, and not to limit the scope of the invention.

Figure 1:
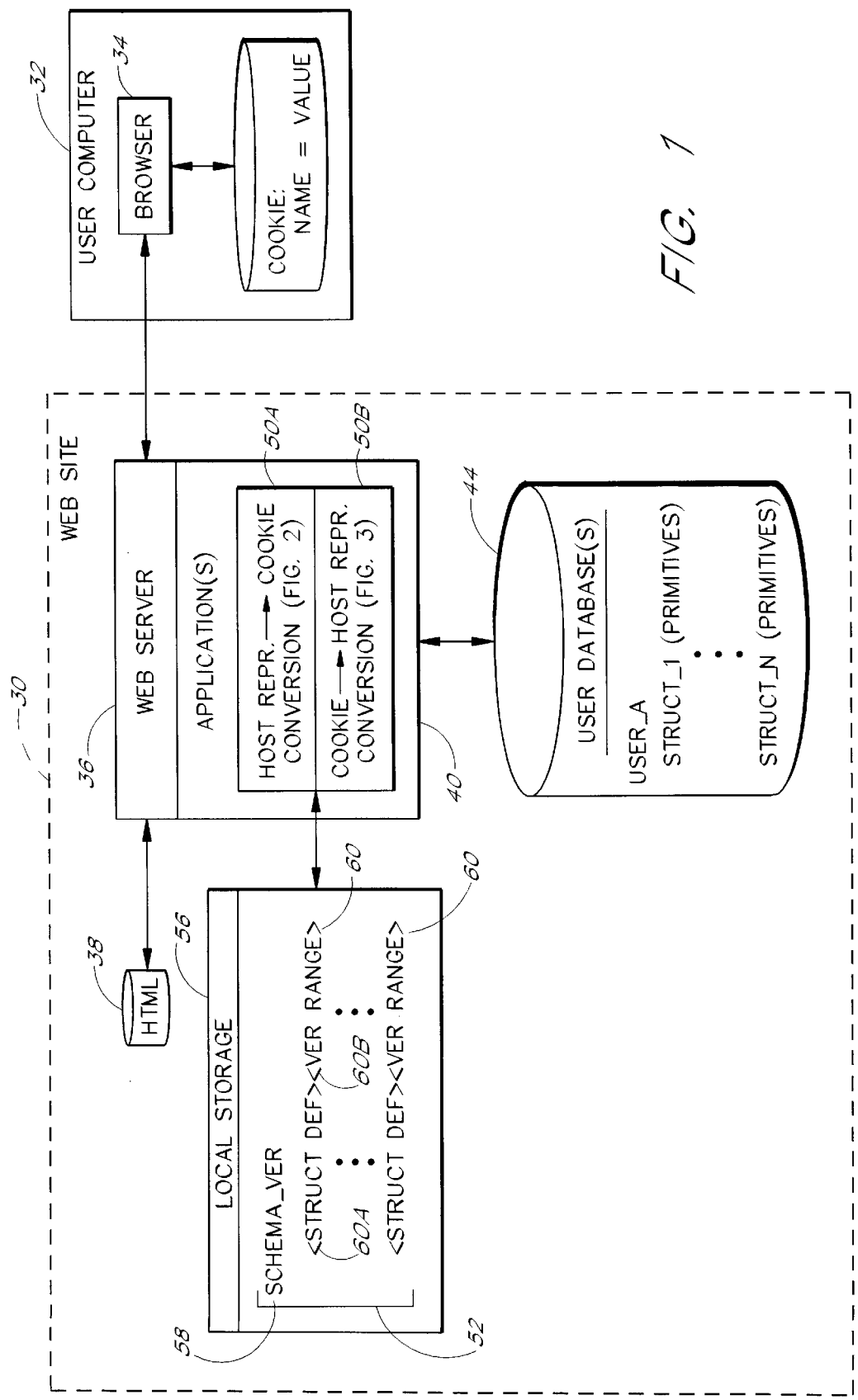
FIG. 1 illustrates a Web site system according to a preferred embodiment of the invention.

FIG. 1 illustrates a Web site system ("Web site") 30 according to a preferred embodiment of the invention, and illustrates a representative user computer 32 that communicates with the Web site via the Internet. For purposes of illustration, it may be assumed that the Web site 30 is the Amazon.com Web site. The user computer includes a Web browser 34, such as Microsoft Internet Explorer 4.0, that supports cookies.

The Web site 30 includes a Web server 36 which accesses a store 38 of HTML (Hypertext Markup Language) documents. The Web site also includes one or more applications 40 that are used to dynamically generate customized Web pages for users. The Web server 36 and the applications 40 may, for example, run on one or more physical servers of the Web site.

As depicted by FIG. 1, the applications 40 access one or more databases or other repositories 44 (collectively "user database") that contain information about known users of the site. In the context of the Amazon.com site, this information may include, for example, user names and identifiers, payment and shipping information, shopping preference information (e.g., 1-Click® settings), shopping cart contents, group discount information, product recommendations, user purchase histories, and service data (e.g., BookMatcher ratings). Different items within the user database 44 may be used by the applications 40 to customize different Web pages or functions.

The information stored in the user database 44 for each user is in the form of multiple structures, STRUCT_1 through STRUCT_N. The structures may include, for example, lists, tables, arrays, variables, records, and other types of elements. Each structure includes one or more primitives, where a primitive is a data element that does not include a reference to another data element. For purposes of illustration, it may be assumed that some of these primitives are in the form of non-character elements (such as 16-bit and 32-bit integers) that are used to customize frequently-accessed Web pages.

Previously, the process of dynamically customizing Web pages for users has required the applications 40 to frequently access the user database 44. For example, when a known user would request the site's home page, information contained within the cookie (or cookies) transmitted with the URL request would be used to look up in the database 44 the user's name and certain preference information; this information would then be used to generate the home page. As described above, such frequent accesses to back-end databases can significantly degrade performance as seen by end users.

In accordance with the invention, the following additional components are provided to reduce the need for accesses to the user database 44. These components include a host representation to cookie conversion module 50A ("host-to-cookie module"), a cookie to host representation conversion module 50B ("cookie-to-host module"), and a schema file 52. The conversion modules 50A, 50B may be in the form of executable functions that can be called by the applications.

The schema file 52, which may alternatively be in the form of a table or other data structure, specifies the user database structures that have been selected (typically by application developers) to be included within cookies. (The term "schema," as used herein, refers generally to the pattern or arrangement of a collection of data elements.) Typically, the structures that are included are those which contain relatively static user data that is used to customize frequently-accessed Web pages. As described below, information about structures that are no longer in use (due to application design changes) is retained within the schema file to support backward and forward compatibility. The schema file 52 thus acts as a specification of past and present schemas used to generate cookies.

The schema file 52 is preferably stored in local storage 56 of the physical server(s) that run the applications 40. For example, where the applications are replicated across multiple physical servers, the schema file 52 may be stored on the hard drive of each such server, and may be cached in the server's RAM to increase performance.

In operation, the conversion modules 50A, 50B perform the task of converting selected structures of the user database 44 (preferably those used for the customization of popular Web pages) between the host representation and a cookie representation. During the cookie generation process, the host-to-cookie conversion module 50A is invoked to convert selected database structures for a particular user into a cookie to be stored on the user's computer; during this process, the schema file 52 is accessed to determine which of the specific structures (or primitives thereof) are to be included within the cookie.

When the cookie is subsequently returned with a URL request, the cookie-to-host module 50B is invoked to convert the cookie back to the host representation used by the applications 40. During the decoding process, the schema file 52 is used to determine the content and format of the embedded structure data. In addition, the schema file 52 is used to determine whether any of the structures contained within the cookie is no longer valid; if any such structure exists, it need not be fully decoded. The structures that are extracted from the cookie are stored in local storage 56 while they are used by the applications 44, and are then deleted. Typically, the extracted information is used to customize one or more Web pages, but the information could also or alternatively be used to perform other types of user-specific functions (e.g., authentication).

In one implementation of the disclosed system, structures that use primitive datatypes of 8, 16, and 32 bit integers and null-terminated ASCII strings are supported. In other implementations of the disclosed design, more complex structures such as nested or cross-referenced structures could be stored.

The content of the schema file 52 will now be described in further detail with reference to FIG. 1. As illustrated, the schema file 52 includes a global schema version number 58 (SCHEMA_VER) which, as described below, is incremented when certain types of changes are made to the schema. The schema file 52 also includes a sequence of structure entries 60, each of which corresponds to a particular database structure that has been selected for inclusion. Each entry 60 includes a structure definition portion 60A and a valid version range portion 60B. The structure definition portion 60A contains the metadata for the corresponding structure, including a list of the primitive fields of the structure and their datatypes and address offsets.

The valid version range 60B specifies the range of schema version numbers for which the corresponding structure is valid, and consists of an upper bound and a lower bound. Since the deletion of a structure is rarely planned in advance, the upper bound of the valid version range 60B for a structure is preferably set to be unlimited. As discussed below, a structure can be retired by incrementing the global schema version number 58 and setting the upper bound of the valid version range 60B of the structure to be less than the new global version number.

To support the ability to read both old and new cookies, the schema file 52 is modified according to the following set of rules.

1. The set of data elements specified within a structure definition 60A cannot be modified.
2. No insertions into, or deletions from, the sequence of structure entries 60 are permitted.
3. A new structure can be added to the schema by adding a new entry 60 to the sequence and incrementing the global schema version number.
4. To retire a structure, the upper bound of the structure's version range 60B is set to the current global version number 58, and all deployed application software is updated to reflect this change. The global version number 58 is then incremented.

These rules may be followed "by hand" by developer(s) during manual editing of the schema file 52. Alternatively, a special management layer could be provided which enforces these rules.

Figure 2:
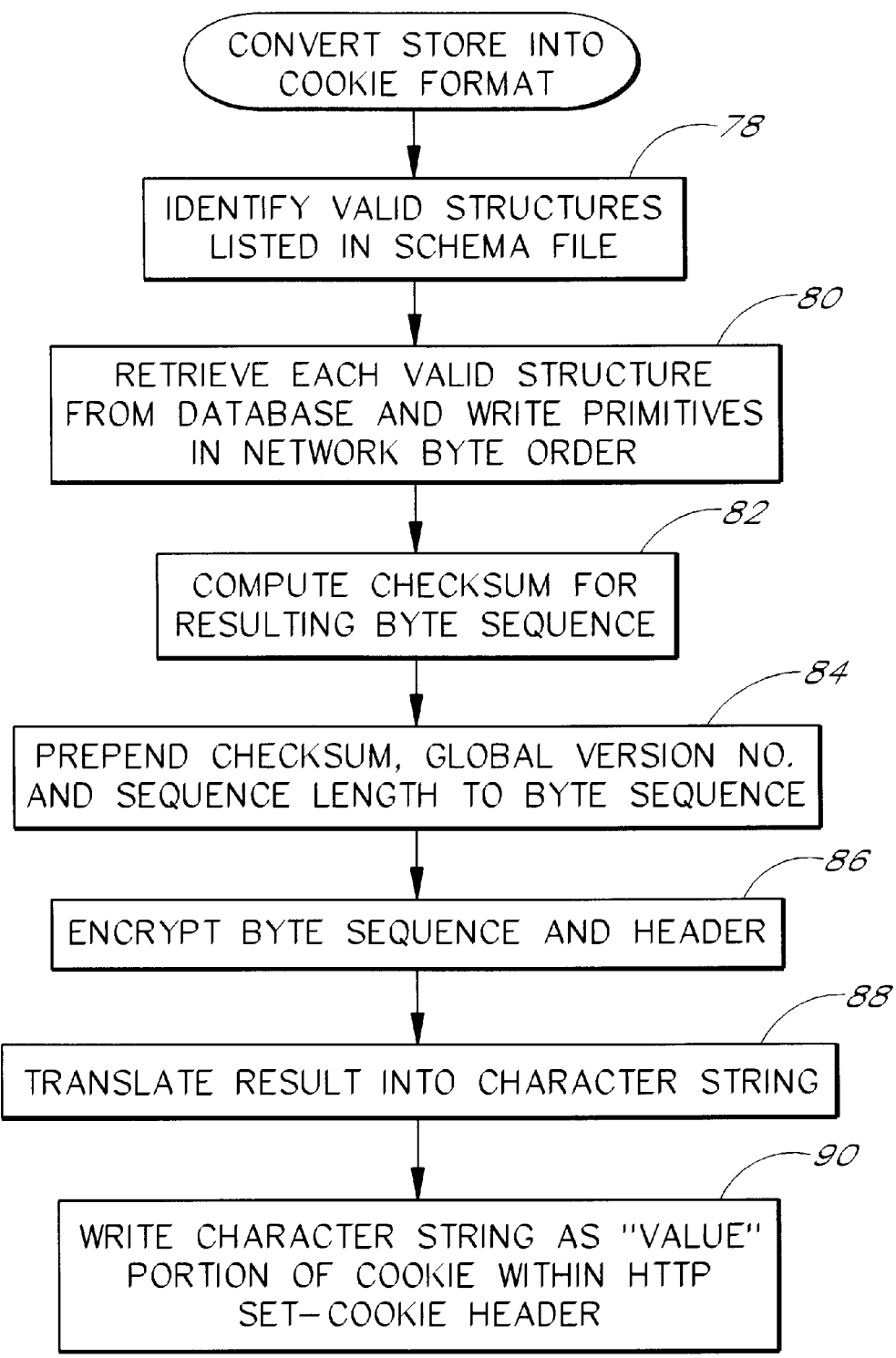
FIG. 2 illustrates a preferred sequence of steps that are implemented by the host-to-cookie module of FIG. 1 to translate a sequence of structures to a cookie format.
Figure 3:
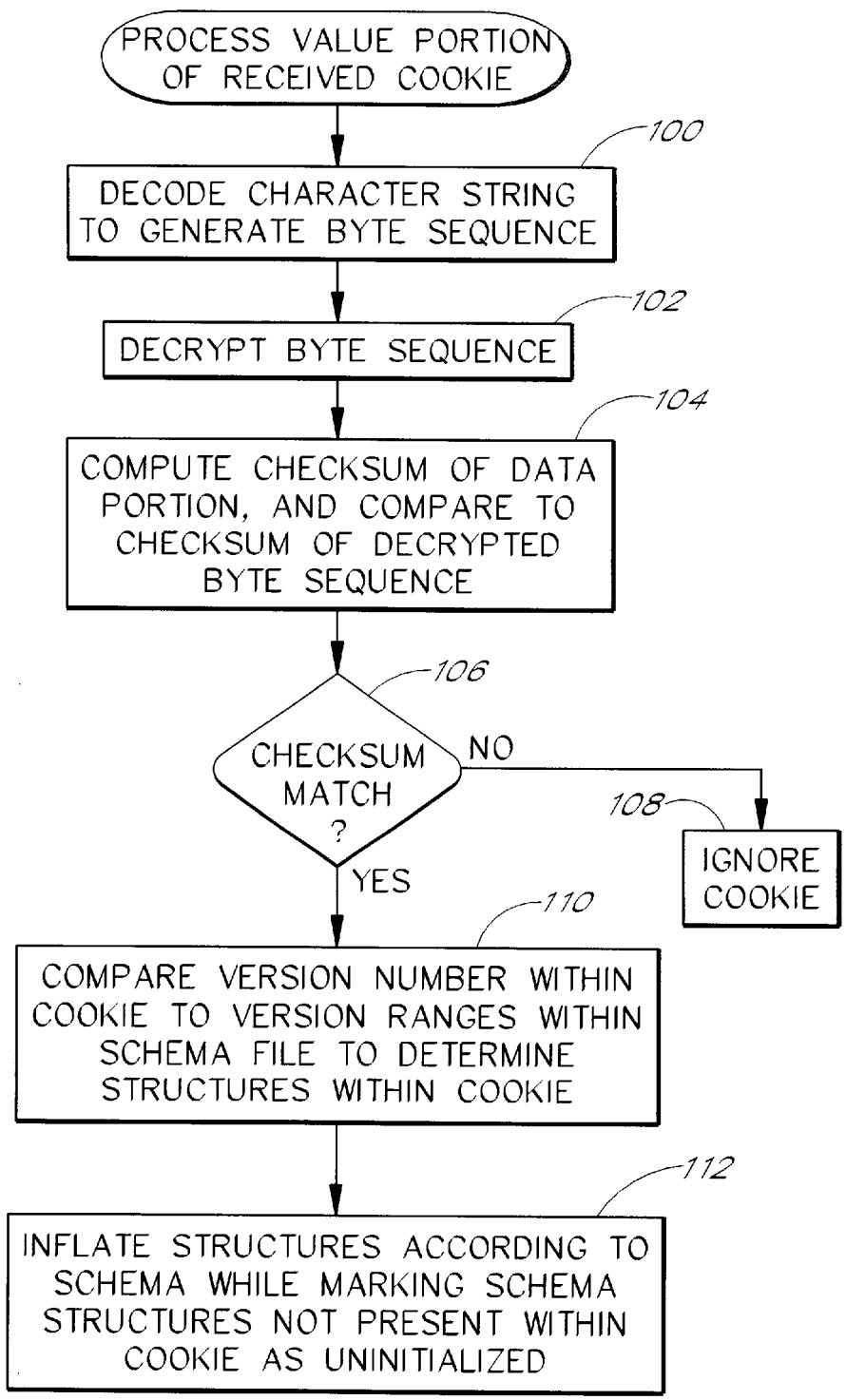
FIG. 3 illustrates a preferred sequence of steps that are implemented by the cookie-to-host conversion module of FIG. 1 to convert a character string back to the original host representation.

FIG. 2 illustrates a preferred sequence of steps that are implemented by the host-to-cookie module 50A to translate the sequence of structures to a cookie format. All but the final step 90 of this process can optionally be performed in an off-line mode, rather than in response to a URL request, to reduce the delay experienced by the user.

The first step 78 of the process involves accessing the schema file 52 to identify the structures to be included within the cookie. This involves identifying the structures listed in the schema file 52 that are currently valid (i.e., have a valid version number range 60B which includes the global schema version number 58).

In step 80, each valid structure is read from the user database 44, and the primitive elements of the structure are sequentially written in their network byte order. Conventional NTOHL and HTONL families of functions may be used for this purpose. Putting the primitives in network byte order allows machines having different endian architectures to be used for generating and decoding cookies. The result of step 80 is a variable-length sequence of bytes which represents the primitive elements of the valid structures.

In step 82, a checksum is computed for the resulting sequence of bytes. A 32-bit checksum may be used for this purpose. The checksum provides a mechanism for later determining whether the cookie has been modified. The checksum, global version number 58, and the length of the sequence are then prepended or otherwise attached to the byte sequence (step 84), with these values being again written in network byte order. In step 86, the resulting sequence is encrypted using a standard encryption library (not shown).

As indicated by step 88, the resulting, encrypted byte sequence is then translated into a character string. This is preferably accomplished by dividing the sequence of bytes into a sequence of six-bit values (padding the sequence as needed to provide even divisibility), and converting each six-bit value into a base-64 digit. The character set used for this purpose consists of the numbers 0–9, all upper-case and lower-case alphabetical characters, and the characters "@" and "?." Any of a variety of other character sets and conversion schemes could be used for this purpose.

Finally, in step 90, the resulting character string is written to the corresponding user's computer 32 as the value portion of a cookie. As is conventional, the cookie is written by including a Set-Cookie header within an HTTP response to the browser 34. The user's structures that are written to the cookie are preferably retained within the user database 44, but could alternatively be deleted to reduce server storage burden.

When the cookie is subsequently transmitted to the Web server 36 as part of a URL request, the cookie-to-host conversion module 50B applies the above steps in reverse order to convert the character string back to the original host representation. As depicted by FIG. 3, the first step 100 of this process involves decoding the character string to reproduce the encrypted byte sequence. The encrypted byte sequence is then decrypted (step 102) using the same encryption library and key used for encryption. At this point, the length, version number, checksum and data are available in network byte order.

As represented by step 104, a checksum is then computed for the extracted data portion, and this checksum is compared to the extracted checksum to determine whether the cookie value was modified. If a mismatch occurs, the cookie is ignored (steps 106 and 108); in this event, the user database 44 may be accessed to retrieve the desired user data.

Otherwise, the structures are "inflated" to their host representation according to the information contained within the schema file, and are written to local storage 56 (steps 110 and 112) for use by the applications. During this process, the version number contained within the cookie is compared to the valid version ranges 60B of the schema file 52 (step 110). If the version number is within or exceeds the valid range of a schema entry 60, that structure is inflated from the byte structure; otherwise, there is no data stored within the cookie for that structure, and the structure is skipped and marked as uninitialized (step 112).

The above scheme allows values stored in old versions of cookies to be read by new versions of application software. If the cookie predates the addition of a structure to the end of the schema sequence, that structure is simply marked as uninitialized so that it can be treated as such by the new application software. If a structure has been deactivated (retired), the data from an old cookie will still be read but may then be ignored by the new application software. Further, cookies associated with new versions of application software can be read by old versions of the software.

As will be appreciated by the foregoing, the schema used to generate each cookie could alternatively be incorporated into that cookie. Doing so, however, increases the cookie size, and can decrease performance. The above-described approach of keeping track of the current and past schemas in a schema file or other server data structure is therefor preferred. It will also be recognized that the information stored within the schema file 52 could be distributed across multiple different files or data structures and/or represented in a different form.

Although this invention has been described in terms of certain preferred embodiments, other embodiments that are apparent to those or ordinary skill in the art are also within the scope of this invention.

What is claimed is:

1. In a web site system in which data structures used to customize web site content for users are stored within a database, a method of incorporating at least one data structure from the database into a browser cookie to reduce accesses to the database, the at least one data structure including a plurality of primitives, the primitives each comprising at least one byte, which plurality include at least one primitive of a non-character data type, the method comprising:

storing, on a server of the web site, schema data which specifies a schema for encoding the at least one data structure within browser cookies;

translating the at least one data structure, including the plurality of primitives, into a character string according to the schema;

incorporating the character string into a browser cookie to be stored on a user computer; and subsequently, in response to the server receiving the browser cookie from the user computer, using the schema data to translate the character string back into the at least one data structure;

wherein the step of translating the at least one data structure into a character string is performed by executable code according to the schema data, such that types of data structures encoded within browser cookies may be changed over time by modifying the schema, without modifying the executable code.

2. The method of claim 1, wherein translating the at least one data structure into a character string comprises calculating a checksum, and incorporating the checksum and a length value into the character string.

3. The method of claim 1, wherein translating the at least one data structure into a character string comprises incorporating a schema version identifier into the character string.

4. The method of claim 1, wherein translating the at least one data structure into a character string comprises encrypting a representation of the plurality of primitives.

5. The method of claim 1, wherein the plurality of primitives include primitives of at least one of the following data types: 8-bit integers, 16-bit integers, and 32-bit integers.

6. The method of claim 1, further comprising generating a custom web page using information stored within the at least one data structure as regenerated from the character string.

7. The method of claim 1, wherein using the schema data to translate the character string back into the at least one data structure comprises comparing a schema version identifier within the browser cookie to a schema representation stored on the server to identify types of data structures represented within the cookie.

8. The method of claim 1, wherein the first component translates the at least one data structure into the character string in an off-line mode.

9. The method of claim 1, wherein the at least one data structure comprises a table.

10. A method of generating a customized web page, comprising:

at a server, receiving a cookie from a user computer, wherein the cookie includes an encoded representation of an entire data structure having non-character primitives, the primitives each comprising at least one byte;

within a memory of the server, reproducing the data structure having non-character primitives from character data contained within the cookie; and generating a custom web page using information contained within the data structure as reproduced within the memory of the server;

wherein reproducing the data structure comprises comparing a schema version identifier within the cookie to a schema representation stored on the server to identify types of data structures represented within the cookie.

11. The method as in claim 10, wherein the custom web page is generated without accessing a database.

12. The method as in claim 10, wherein reproducing the data structure comprises computing a checksum from data contained within the cookie, and comparing the checksum as computed to a checksum extracted from the cookie.

13. The method as in claim 10, wherein reproducing the data structure comprises decrypting encrypted data stored in the cookie.

14. The method as in claim 10, wherein the data structure includes primitives of at least one of the following data types: 16-bit integers, 32-bit integers.

15. A server system that generates web pages according to the method of claim 10.

16. A web page generated according to the method of claim 10.

17. The method as in claim 10, wherein the step of reproducing the data structure is performed by executable code that is not specific to a particular type of data structure, and is performed based on schema data that specifies how the data structure is encoded within the cookie.

18. A system for representing data structures within cookies, comprising:

schema data that specifies past and present schemas used to encode data structures within cookies, including data structures having primitives of non-character data types;

a first component that encodes data structures into cookies to be stored on user computers based on a current schema specified by the schema data, wherein the first component translates non-character data of the data structures into character data, and incorporates the character data into the cookies; and a second component that decodes cookies received from the user computers and reproduces data structures represented therein based on the schema data.

19. The system of claim 18, wherein first component stores a schema version identifier within the cookies, and the second component uses the schema version identifier and the schema data to determine types of data structures represented within received cookies.

20. The system as in claim 18, further comprising an application component that generates custom web pages using data structures reproduced by the second component.

21. The system as in claim 18, wherein the first component encodes checksum values into the cookies, and the second component uses the checksum values as encoded within the cookies to verify the validity of the cookies.

22. The system as in claim 18, wherein the first component encodes tables into cookies.

23. The system of claim 18, wherein the system allows types of data structures encoded within cookies to be modified over time without modifying executable code of the first and second components.

24. The system of claim 18, wherein the first and second components are not specific to a particular type of data structure.

25. The system of claim 18, wherein the first component uses a common encoding method for all types of data structures that may be specified by the schema data.

26. A method for efficiently generating personalized web pages, the method comprising:

storing a data structure within a database of a web site system, wherein the data structure comprises non-character data used to personalize a web page for a user of the web site system;

converting the data structure, including the non-character data thereof, into character data;

storing the character data as cookie data on a computer of the user; and on a server of the web site system, in response to receiving the cookie data and a request for the web page from the computer of the user, regenerating the data structure in a local memory of the server from the cookie data, and using the data structure as regenerated in the local memory to personalize the web page for the user;

wherein the data structure is converted to the character data, and is regenerated in the local memory of the server, by executable code that is not specific to a particular type of data structure, said executable code accessing schema data that specifies how the data structure is encoded within a cookie;

whereby the data structure is used to personalize the web page without having to retrieve the data structure from the database in response to the request for the web page.

27. The method as in claim 26, wherein the data structure comprises at least one of the following types of primitives: 16-bit integers, 32-bit integers.

28. The method as in claim 26, wherein the data structure comprises a table.

29. The method as in claim 26, wherein converting the data structure into character data comprises generating a checksum value that is dependent upon data stored in the data structure, and incorporating the checksum value within the character data.

30. The method as in claim 26, wherein converting the data structure into character data comprises encrypting data stored in the data structure.

31. The method as in claim 26, further comprising including a schema version number within the cookie data, wherein the schema version number indicates a schema version used to convert the data structure into character data.

32. A server system that generates personalized web pages according to the method of claim 26.

33. A personalized web page generated according to the method of claim 26.

34. The method as in claim 26, wherein converting the data structure comprises converting a plurality of data structures into the character data.

35. A method of generating a browser cookie, the method comprising:

identifying a set of data structures that are used to personalize at least one web page for a user, wherein the set of data structures includes at least one data structure that contains non-character primitives;

translating the set of data structures into character data according to a schema, such that the set of data structures may be encoded within a browser cookie; and incorporating the character data into a browser cookie for storage on a user computer;

wherein new types of data structures may be added to the set of data structures over time by updating the schema, without modifying executable code used to translate the set of data structures into character data.

36. The method as in claim 35, wherein translating the set of data structures into character data comprises generating a checksum value that is dependent upon data contained in the set of data structures, and incorporating the checksum value into the character data.

37. The method as in claim 35, wherein translating the set of data structures into character data comprises encrypting data contained in the set of data structures.

38. A browser cookie generated according to the method of claim 32.

39. The method as in claim 35, wherein translating the set of data structures into character data further comprises encoding a schema version identifier within the character data, wherein the schema version identifier indicates a version of said schema.

40. A method of generating a customized web page, comprising:

at a server, receiving a cookie from a user computer, wherein the cookie includes an encoded representation of an entire data structure having non-character primitives, the primitives each comprising at least one byte;

within a memory of the server, reproducing the data structure having non-character primitives from character data contained within the cookie; and generating a custom web page using information contained within the data structure as reproduced within the memory of the server;

wherein the step of reproducing the data structure is performed by executable code that is not specific to a particular type of data structure, and is performed based on schema data that specifies how the data structure is encoded within the cookie.

41. The method as in claim 40, wherein the custom web page is generated without accessing a database.

42. The method as in claim 40, wherein reproducing the data structure comprises computing a checksum from data contained within the cookie, and comparing the checksum as computed to a checksum extracted from the cookie.

43. The method as in claim 40, wherein reproducing the data structure comprises decrypting encrypted data stored in the cookie.

44. The method as in claim 40, wherein the data structure includes primitives of at least one of the following data types: 16-bit integers, 32-bit integers.

45. A server system that generates web pages according to the method of claim 40.

46. A web page generated according to the method of claim 40.

* * * * *